United States Patent
Murakami et al.

(10) Patent No.: US 6,590,615 B2
(45) Date of Patent: Jul. 8, 2003

(54) DIGITAL VIDEO RECEIVING APPARATUS

(75) Inventors: Tokumichi Murakami, Tokyo (JP); Hideo Ohira, Tokyo (JP)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/970,951

(22) Filed: Oct. 5, 2001

(65) Prior Publication Data

US 2002/0012069 A1 Jan. 31, 2002

Related U.S. Application Data

(62) Division of application No. 09/132,676, filed on Aug. 12, 1998.

(30) Foreign Application Priority Data

Mar. 24, 1998 (JP) ............................................. 10-075303

(51) Int. Cl.⁷ ............................ H04N 11/04; H04N 5/46
(52) U.S. Cl. ...................... 348/555; 348/725; 348/726; 348/731; 348/729; 348/385.1; 348/388.1
(58) Field of Search ................................. 348/725, 726, 348/731, 512, 553, 385.1, 727, 728, 729, 555, 387.1, 388.1, 389.1, 588, 383; 725/151, 9; 375/240.26, 327

(56) References Cited

U.S. PATENT DOCUMENTS

| | | | |
|---|---|---|---|
| 5,289,276 A | | 2/1994 | Siracusa et al. |
| 5,493,339 A | | 2/1996 | Birch et al. |
| 5,583,562 A | * | 12/1996 | Birch et al. .................. 725/151 |
| 5,617,151 A | * | 4/1997 | Lee ............................. 348/731 |
| 5,757,909 A | | 5/1998 | Park |
| 5,909,257 A | * | 6/1999 | Ohishi et al. ................ 348/726 |
| 5,940,148 A | * | 8/1999 | Joseph et al. ................ 348/845 |
| 6,049,651 A | * | 4/2000 | Oshima ........................ 386/46 |
| 6,061,387 A | | 5/2000 | Yi |
| 6,067,653 A | * | 5/2000 | Tsukagoshi ................. 714/746 |
| 6,101,195 A | | 8/2000 | Lyons et al. |
| 6,115,080 A | | 9/2000 | Reitmeier |
| 6,118,498 A | * | 9/2000 | Reitmeier .................... 348/725 |
| 6,160,570 A | * | 12/2000 | Sitnik ............................ 725/9 |
| 6,233,253 B1 | * | 5/2001 | Settle et al. ................. 370/474 |
| 6,356,312 B1 | * | 3/2002 | Lyu .............................. 348/512 |
| 6,380,984 B1 | * | 4/2002 | Inoue et al. ................. 348/569 |

FOREIGN PATENT DOCUMENTS

| | | |
|---|---|---|
| CN | 1168053 A | 12/1997 |
| EP | 0506400 | 9/1992 |
| EP | 0527632 | 2/1993 |
| EP | 0578201 | 1/1994 |
| EP | 0725539 | 8/1996 |

OTHER PUBLICATIONS

Dr. Michael Thiele, "Digitales Fernsehen witd Realitat", Elektronik vol. 45 No. 7, Apr. 2, 1996, pp. 70–74 and 79–82.
Shinichi Hattori et al., "Codic having Broadcast Quality used for Satellite Communication", Mitsubishi Denki Technical Report, vol. 67, No. 7, pp. 33–38, 1993.

* cited by examiner

Primary Examiner—John Miller
Assistant Examiner—Paulos Natnael
(74) Attorney, Agent, or Firm—Birch, Stewart, Kolasch & Birch, LLP

(57) ABSTRACT

The present invention provides a digital video receiving apparatus for displaying a plurality of digital TV pictures on a plurality of receiving terminal apparatuses. The digital video receiving apparatus includes a tuner for extracting the received digital TV multiplexed signal, a demodulator for decoding the digital signals provided from the tuner, a demultiplexer for demultiplexing the multiplexed signals outputted from the demodulator to obtain a bit stream including a video signal, an audio signal and a data signal. The digital video receiving apparatus further includes a video decoder, an audio decoder and a data decoder for decoding signals outputted from the demultiplexer. The digital video receiving apparatus decodes the input multiplexed digital TV signal and outputs a video signal, an audio signal and a data signal corresponding to respective programs.

12 Claims, 14 Drawing Sheets

DIGITAL VIDEO RECEIVING APPARATUS

This application is a divisional of co-pending application Ser. No. 09/132,676, filed on Aug. 12, 1998, the entire contents of which are hereby incorporated by reference and for which priority is claimed under 35 U.S.C. §120; and this application claims priority of Application No. 10-075303 filed in JAPAN on Mar. 24, 1998 under 35 U.S.C. §119.

FIELD OF THE INVENTION

The present invention relates to a digital video receiving apparatus for receiving a digital video signal in relation to a digital TV, a digital CATV and a digital broadcasting device.

DESCRIPTION OF THE PRIOR ART

FIG. 14 shows a multimedia information processing apparatus disclosed in "a codec having broadcasting quality for satellite communication", Hattori, Tanaka, Asano, Asai and Sakado, Mitsubishi Denki Technical Gazette, Vol. 67, No. 7, pp. 33–38 (1993).

A conventional digital video receiving apparatus is explained using FIG. 13 and FIG. 14. FIG. 13 shows an example of a signal frequency layout on a satellite transponder having a two-wave transmission mode. In FIG. 13, a high picture quality mode means a mode for transmitting two-waves on a transponder and a higher quality video and audio. SNG (Satellite News Gathering) multiplex mode means a mode for multiplexing two programs of SNG mode, which can transmit four waves in maximum via a transponder of a communication satellite "Super Bird", and for transmitting two video programs via one wave. In FIG. 13, the two-waves are multiplexed and each wave multiplexes two programs.

When the two-waves shown in FIG. 13 are demultiplexed and received simultaneously, four program digital video receiving apparatuses 400 (two apparatuses×two programs) (shown in FIG. 14) are necessary. In the high picture quality mode, one wave carries one program, but in the SNG multiplex mode two programs are carried in one wave as shown in FIG. 14. The decoding operation of the SNG multiplex mode is explained below.

In FIG. 14, a down converter 402 selects any one of SNG multiplexed waves 511 or 512 in FIG. 13 from a received IF (Intermediate Frequency) signal 401. QPSK demodulator 403 digitally demodulates the selected wave. A Viterbi decoder 404 corrects errors and a 2CH demultiplexer 410 demultiplexes a wave signal into two programs. One of the program signals is corrected through a de-interleave portion 411, a Reed-Solomon decoder 412 and a de-scramble portion 413 and outputted to a demulitplexer 430.

The other program signal is demultiplexed by the 2CH demultiplexer 410 into a digital video output 422, which is inputted into the 2CH demultiplexer 410 of the other program digital video receiving apparatus 400 as a digital video output 421. The output signal from the 2CH demultiplexer 410 of the other program digital video receiving apparatus 400 is also corrected through the circuits 411, 412 and 413 and outputted to the demultiplexer 430 in the same manner as described above.

Conventionally, one SNG multiplexed wave includes two programs. The respective SNG multiplexed wave is demultiplexed into one program by the 2CH demultiplexer 410 and outputted to the demultiplexer 430. A video decoder 432 receives a VBI (vertical blanking line interval) signal 431 from the demultiplexer 430 and outputs a video signal 441 to a terminal. An audio decoder 433 decodes an audio coded signal received from the demultiplexer 430 to output an audio signal 422. Similarly, an order-wire-interface 434 outputs a communication signal 443 and a data-interface 435 outputs a terminal data signal 444.

Conventionally, only digitally coded programs can be received. Therefore, an analog video picture and a digital video picture cannot be received by the same receiving terminal apparatus.

A conventional digital video receiving terminal apparatus only can receive one digital video program, but it cannot display a multi-channel digital video picture.

Also, the conventional digital video receiving terminal apparatus cannot display respective different digital video pictures on a plurality of terminals (monitors).

A data demultiplexer of the conventional digital video receiving terminal apparatus can only demultiplex data accompanied with one program, but it cannot demultiplex data corresponding to a plurality of digital video programs.

For example, when the computing quantity for decoding HDTV (High Definition Television) of a high picture quality digital TV is six times as much as that for SDTV (Standard Definition Television) of a normal digital TV, a data decoder of the conventional digital video receiving terminal apparatus can decode one HDTV picture or one SDTV picture, but it cannot decode a plurality of SDTV pictures, simultaneously, or a plurality of SDTV pictures plus one HDTV picture, simultaneously.

SUMMARY OF THE INVENTION

It is an object of the present invention to be able to see different programs independently on a plurality of monitors using one digital video receiving apparatus.

It is another object of the present invention to be able to see one HDTV program as well as a plurality of SDTV programs at the same time on a monitor using one digital video receiving apparatus.

It is a further object of the present invention to be able to see digital TV programs sent by digital signal as well as analog TV programs sent by analog signal at the same time on a monitor using one digital video receiving apparatus.

According to one aspect of the invention, a digital video receiving apparatus receives digital broadcasting programs including a plurality of multiplexed media such as video, audio and data, and provides the programs to subscribers. The apparatus includes a tuner for receiving a multiplexed signal and converting it to a digital base band signal and a demodulator for decoding the digital base band signal provided from the tuner. The apparatus further includes a demultiplexer for selecting one or more programs from the multiplexed programs including a plurality of media such as a video signal, an audio signal and a data signal according to a program selection signal provided from outside, and for demultiplexing respective bit streams including a video signal, an audio signal or a data signal. The apparatus further includes a video decoder for decoding the video signal demultiplexed by the demultiplexer, an audio decoder for decoding the audio signal demultiplexed by the demultiplexer, and a data decoder for decoding the data signal demultiplexed by the demultiplexer.

According to another aspect of the invention, the video decoder in the digital video receiving apparatus includes a bit stream divider and a plurality of video decoding units, each of the video decoding units including a partial video decoder and a memory. The bit stream divider generates video streams including a video signal, an audio signal and a data signal for each channel, using a clock and a stream identification signal. Each video decoding unit decodes the respective video stream for each channel using the partial video decoder and the memory, and outputs the decoded signal as a video output signal.

According to a further aspect of the invention, the digital video receiving apparatus further includes a channel demultiplexer for generating a video stream, a clock signal and a stream identification signal for each channel, using a bit stream including a video signal, an audio signal and a data signal, a clock signal and a stream identification signal each of which is outputted from the demultiplexer. The video decoder, the audio decoder and the data decoder process the respective signals for each channel, decode and output the video signal, the audio signal and the data signal for each program.

According to a still further aspect of the invention, the video decoder in the digital video receiving apparatus includes a plurality of video decoding units, each of the video decoding units including a partial video decoder and a memory. Each video decoding unit decodes the bit stream including a video signal, an audio signal and a data signal outputted from the channel demultiplexer, using a clock signal and a stream identification signal, and outputs a decoded signal as a video output signal.

According to a further aspect of the invention, a digital video receiving apparatus receives digital broadcasting programs including a plurality of multiplexed media such as a video, audio and data, and provides the programs to subscribers. The digital video receiving apparatus includes a tuner for receiving a multiplexed signal and converting it to a digital base band signal and a demodulator for decoding the digital base band signal provided from the tuner. The digital video receiving apparatus further includes a demultiplexer for demultiplexing and outputting a bit stream including a video signal, an audio signal and a data signal, a clock and a stream identification signal for each channel according to a selection signal, when a multiplexed signal is SDTV, and for demultiplexing and outputting a bit stream including a video signal, an audio signal and a data signal, a clock and a stream identification signal for each partial picture according to a selection signal, when the multiplexed signal is HDTV. The digital video receiving apparatus further includes a video decoder for decoding the video signal demultiplexed by the demultiplexer, an audio decoder for decoding the audio signal demultiplexed by the demultiplexer, a data decoder for decoding the data signal demultiplexed by the demultiplexer, a display synthesizer for synthesizing a plurality of the signals outputted from the video decoder and generating a video signal to display it on one monitor, an audio selector for selecting one of the audio signals outputted from the audio decoder, and a data selector for selecting one of the data signals outputted from the data decoder.

According to a further aspect of the invention, the video decoder in the digital video receiving apparatus includes a bit stream divider and a plurality of video decoding units, each of the video decoding units including a partial video decoder and a memory. The bit stream divider generates video streams for each channel from the video signal outputted from the demultiplexer, according to the switching signal and each of the video decoding units decodes the video stream for each channel to output a video signal, when the multiplexed signal is SDTV. The bit stream divider further generates video streams for each partial picture from the video signal outputted from the demultiplexer, according to the switching signal and each of the video decoding units decodes the video stream for each partial picture to output a video signal, when the multiplexed signal is HDTV.

According to a further aspect of the invention, the display synthesizer in the digital video receiving apparatus includes a plurality of enlarger/reducer units and a screen overlay unit. The display synthesizer enlarges or reduces sizes of the decoded signals inputted from the video decoder, superposes a plurality of the enlarged or reduced video signals and generates a video signal to display on one monitor in the case of SDTV.

According to a further aspect of the invention, the digital video receiving apparatus further includes an NTSC/PAL decoder. The tuner branches a received multiplexed signal to an analog base band signal and a digital base band signal. The NTSC/PAL decoder decodes the analog base band signal provided from the tuner to generate a decoding video signal. The display synthesizer synthesizes the analog video signal from the NTSC/PAL decoder and the digital video signal from the video decoder, and generates a video signal to display the analog video signal and the digital video signal on one monitor.

According to a further aspect of the invention, the display synthesizer in the digital video receiving apparatus includes a screen regenerator and a screen overlay unit. When no analog TV signal is inputted from the NTSC/PAL decoder, the display synthesizer synthesizes the digital HDTV video signal received from the video decoder to generate a video signal to display on one monitor. When the analog TV signal is inputted from the NTSC/PAL decoder, the screen overlay unit superposes the HDTV video signal and the analog TV signal and generates a video signal to display on one monitor.

BRIEF DESCRIPTION OF THE DRAWINGS

The present invention will become more fully understood by the accompanying drawings which are given by way of illustration only, and thus are not limitative of the present invention and wherein.

The present invention will become more fully understood from the detailed description given hereinbelow and the accompanying drawings which are given by way of illustration only, and thus are not limitative of the present invention.

DETAILED DESCRIPTION OF THE PREFERRED EMBODIMENTS

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

Embodiment 1

Figure 1:
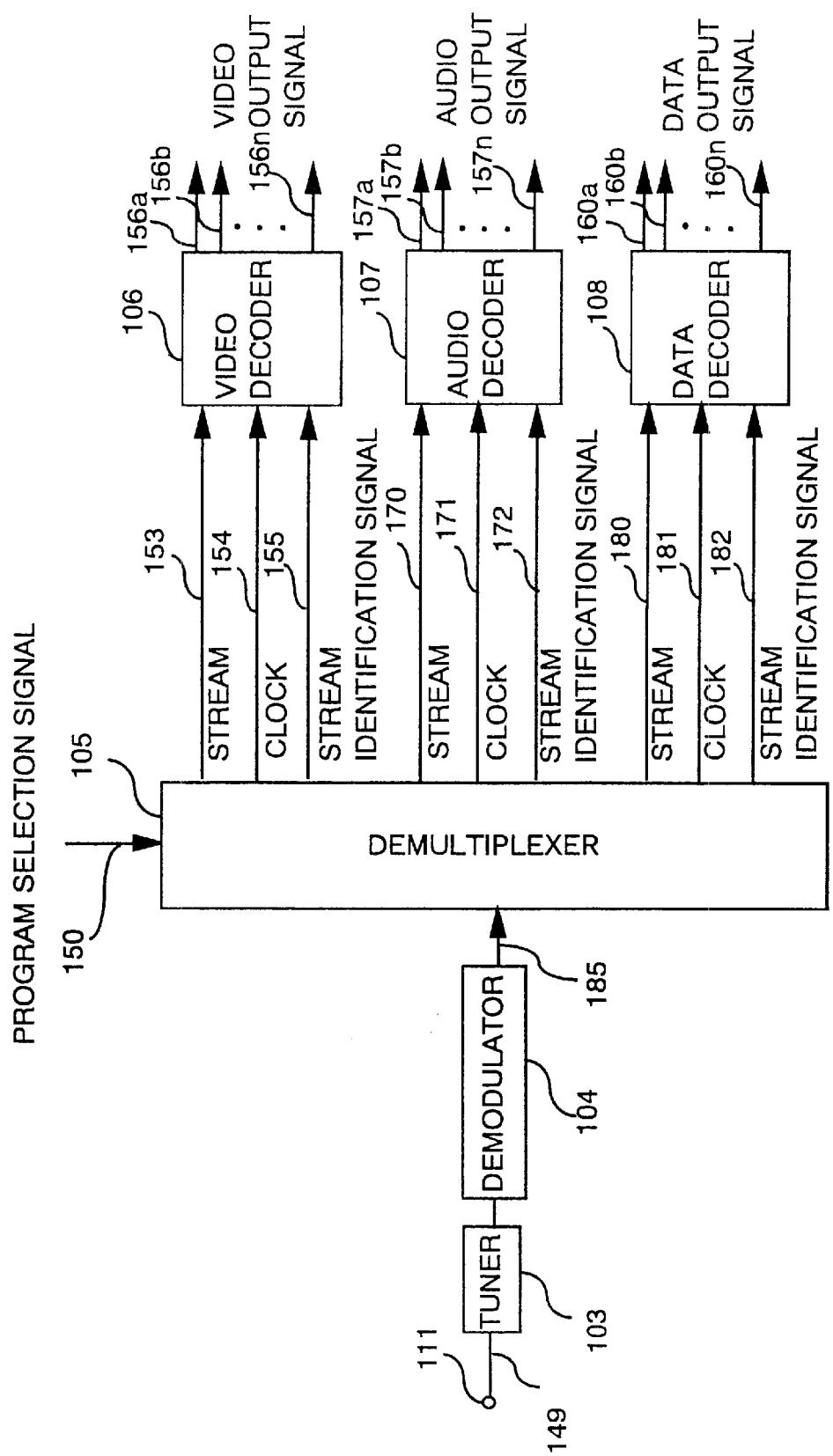
FIG. 1 shows a digital video receiving apparatus of a first embodiment of the present invention.
Figure 2:
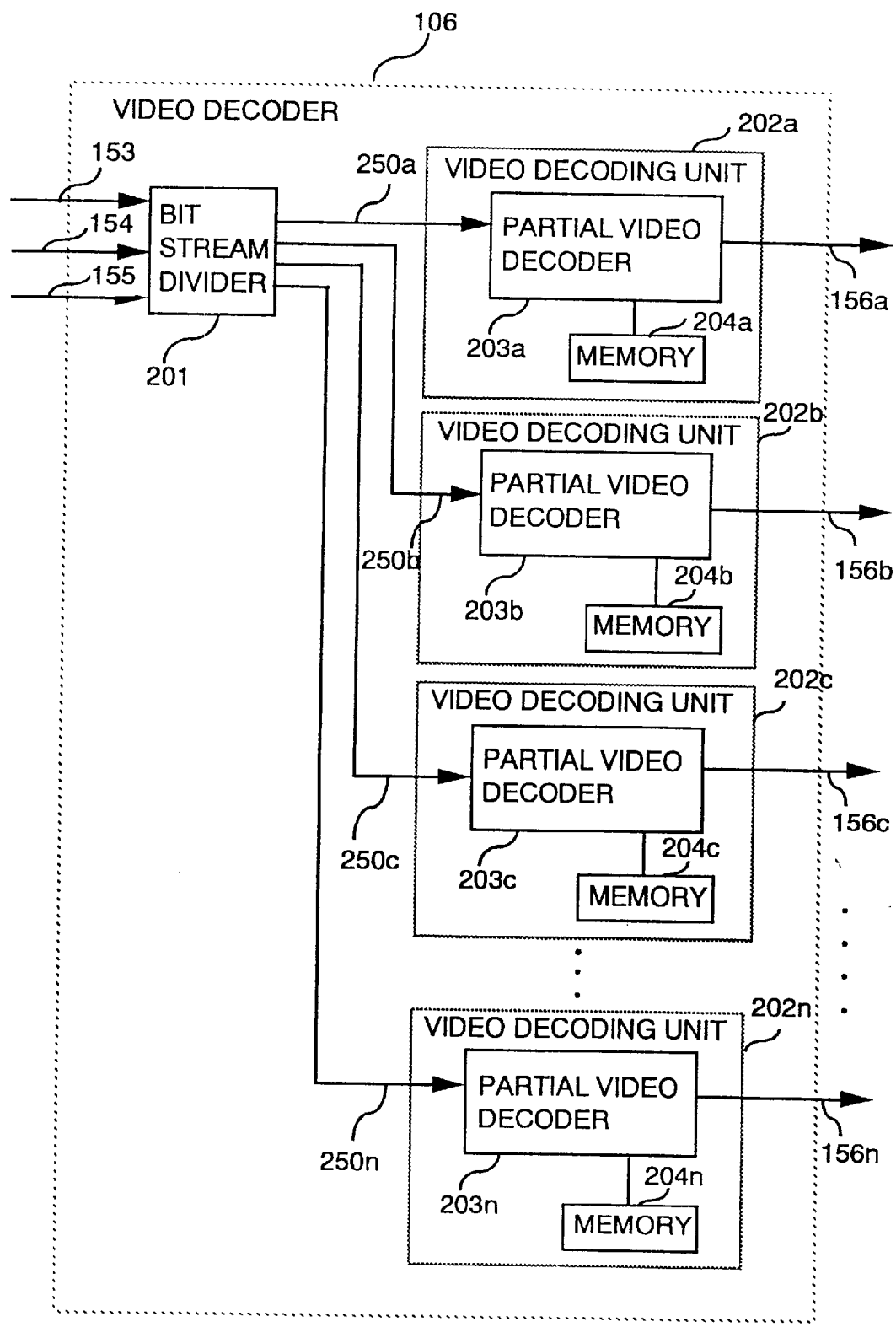
FIG. 2 shows a video decoder used in the digital video receiving apparatus of the first embodiment of the present invention.
Figure 3:
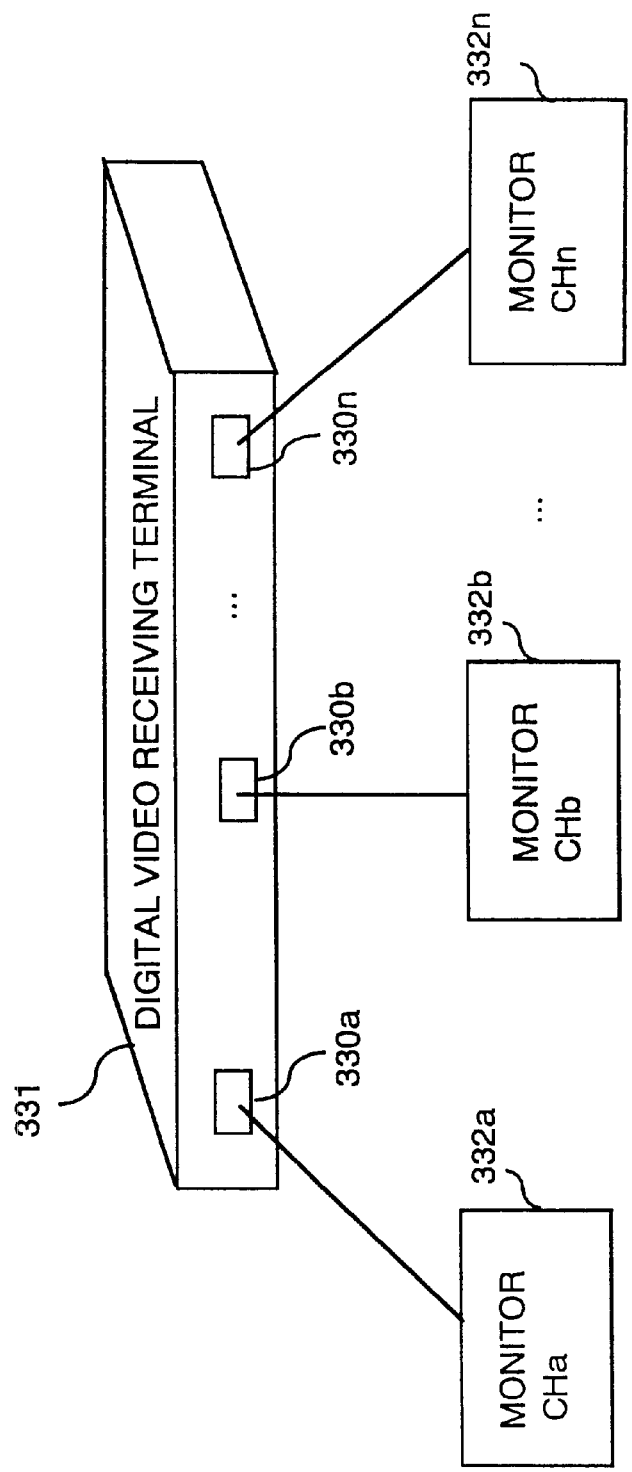
FIG. 3 shows a plurality of monitors connected to the digital video receiving apparatus of the first embodiment of the present invention.

A digital video receiving apparatus of a first embodiment of the present invention is explained using FIGS. 1–3. FIG. 1 shows a schematic diagram of a digital video receiving apparatus of the first embodiment of the present invention. The digital video receiving apparatus of FIG. 1 includes an input terminal 111, a tuner 103, a demodulator 104, a demultiplexer 105, a video decoder 106, an audio decoder 107, a data decoder 108, a received input signal 149, a multiplexed signal 185, a program selection signal 150, a video stream 153, a clock signal 154, a stream identification signal 155, video output signals (156a, 156b . . . 156n), audio output signals (157a, 157b . . . 157n), and data output signals (160a, 160b . . . 160n).

Figure 12:
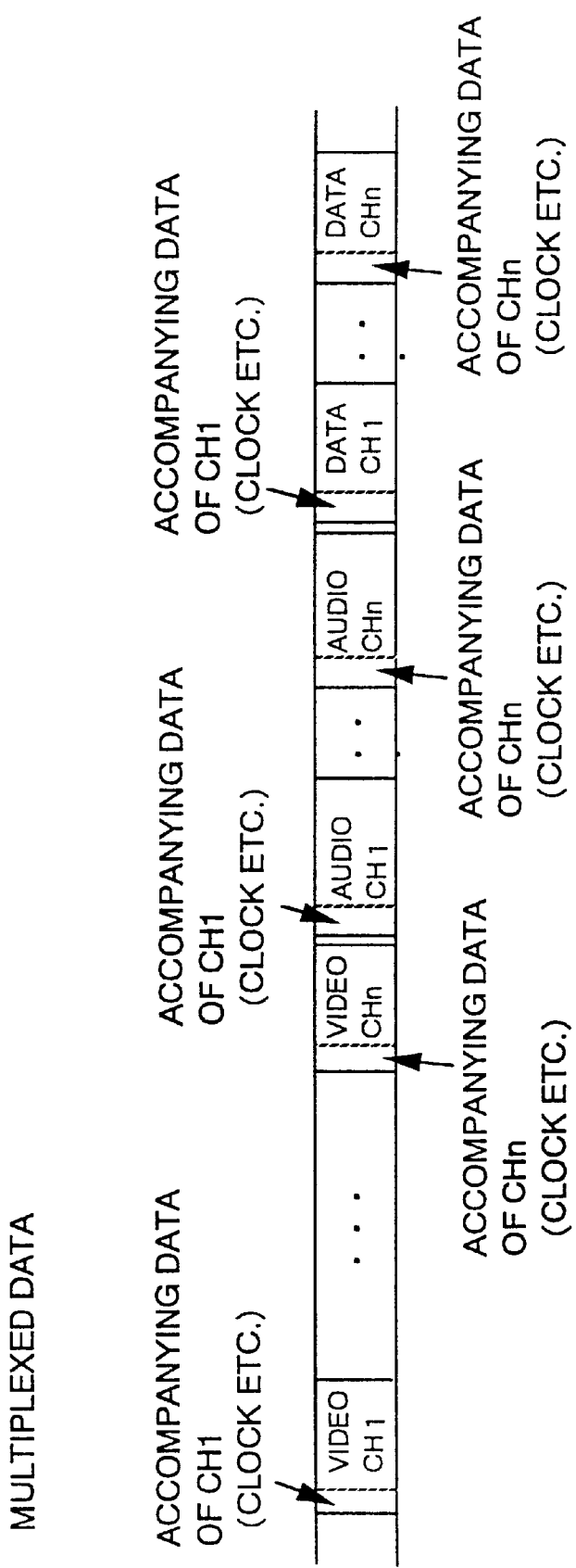
FIG. 12 shows an example of multiplexed signals in the embodiments of the present invention.
Figure 13:
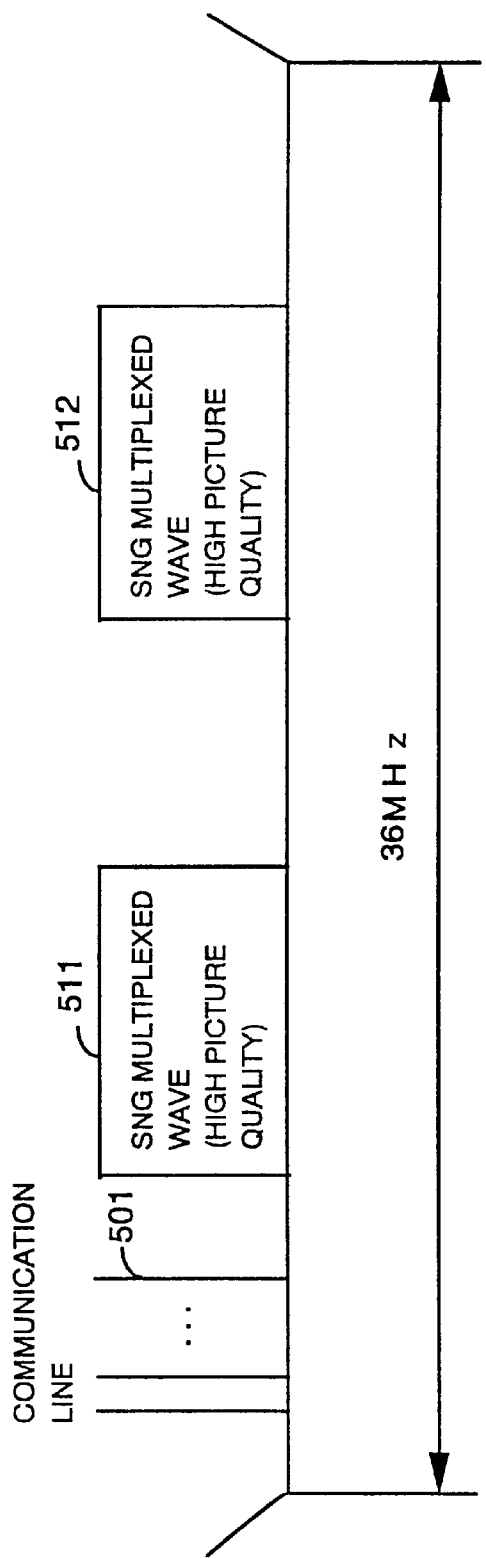
FIG. 13 shows an example of a conventional signal frequency layout on a satellite transponder.
Figure 14:
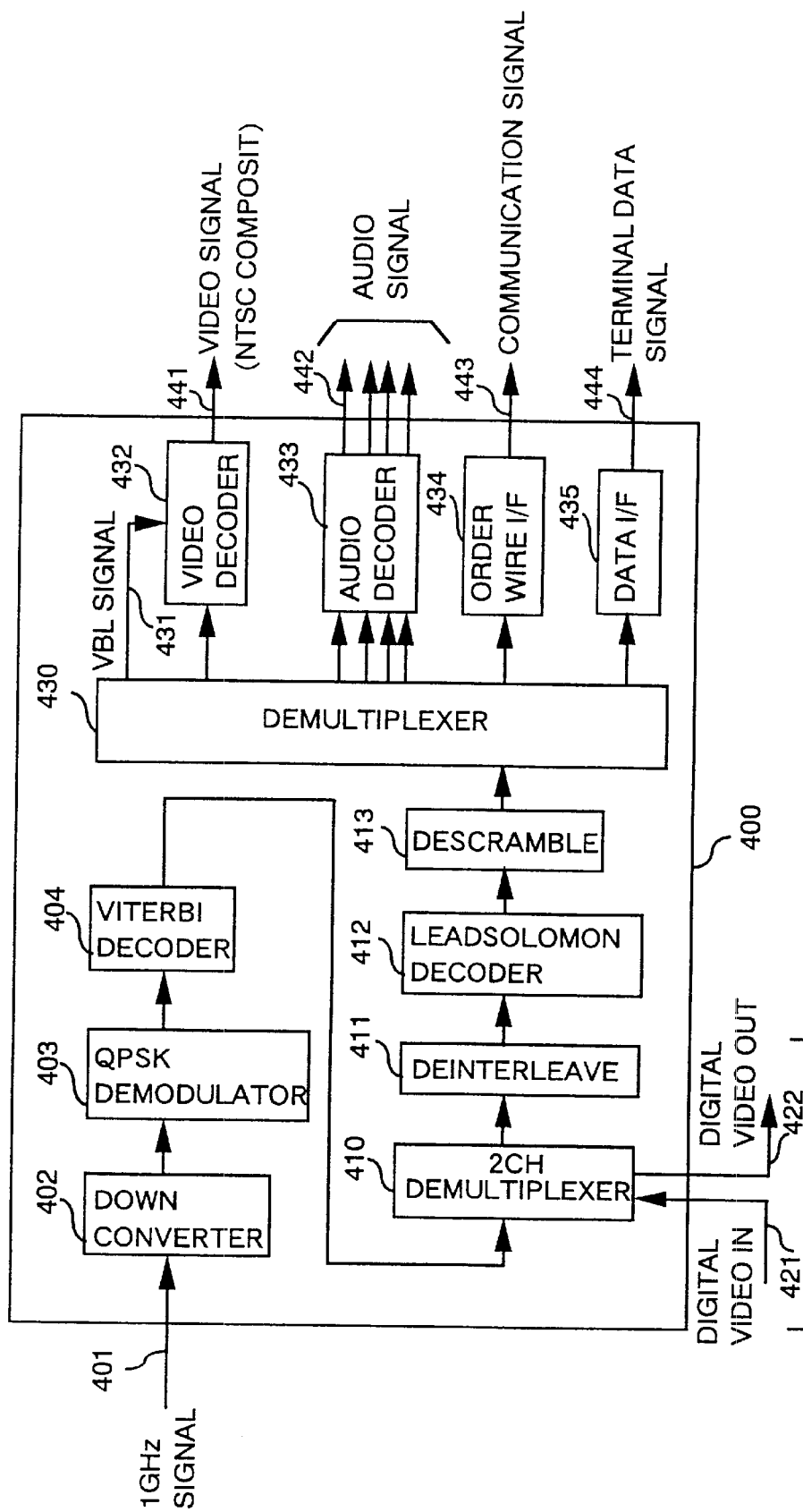
FIG. 14 shows an example of a conventional digital video receiving terminal apparatus.

The operation of the digital video receiving apparatus of the first embodiment of the present invention is explained. The received input signal is inputted to the input terminal 111 and the necessary signal elements thereof are extracted in the tuner 103. Then, the extracted signals are demodulated in the demodulator 104 and output as multiplexed signal 185 to the demultiplexer 105. The multiplexed signal 185 input to the demultiplexer 105 is a multiplexed signal in which a plurality of programs are coded and multiplexed to one stream. The multiplexed signal 185 includes a bit stream comprised of a plurality of programs as shown in FIG. 12. The multiplexed signal 185 in FIG. 12 includes n-channel video signals, n-channel audio signals and n-channel data signals. Headers of each of the video signals, audio signals and data signals include accompanying data such as a clock necessary for each channel.

The demultiplexer 105 demultiplexes a video signal, an audio signal and a data signal from the multiplexed signal 185 and extracts only coded data of a desired program by the program selection signal 150. For example, the demultiplexed video signal includes a video stream 153, a clock signal 154 corresponding to a program, and a stream identification signal 155 which is a control signal for extracting programs. These demultiplexed video signals are outputted to the video decoder 106. The demultiplexed audio signal includes an audio stream signal 170, a clock signal 171 corresponding to a program, and a stream identification signal 172 which is a control signal for extracting a program. These demultiplexed audio signals are outputted to an audio decoder 107. On the other hand, the demultiplexed data signal includes a demultiplexed data signal 180, a clock signal 181 corresponding to a program, and a stream identification signal 182 which is a control signal for extracting a program. The demultiplexed data signals are outputted to the data decoder 108.

The video decoder 106 decodes each video stream using the input clock signal 154 corresponding to the program and the stream identification signal 155, and outputs decoded video signals (156a, 156b, . . . 156n) for each program as video output signals.

The video decoder 106 in the digital video receiving apparatus of the first embodiment of the present invention is explained using FIG. 2. The video decoder of FIG. 2 includes a bit stream divider 201 for dividing input bit streams for each program, video decoders (202a, 202b, . . . 202n) for each channel, partial video decoders (203a, 203b, . . . 203n) for decoding video signals for each channel, memories (204a, 204b, . . . 204n) for each channel which are used to decode video signals and video bit streams (250a, 250b, . . . 250n) for each channel.

The video decoder 106 is explained using FIG. 2. The video stream 153 input to the video decoder 106 is divided into bit streams for each channel corresponding to programs using the stream identification signal 155. A bit stream 250a of an a-channel (CHa) is sent to the video decoding unit 202a, a bit stream 250b of a b-channel (CHb) is sent to the video decoding unit 202b, a bit stream 250c of a c-channel (CHc) is sent to the video decoding unit 202c, and a bit stream 250n of an n-channel (CHn) is sent to the video decoding unit 202n.

The video decoders (202a, 202b, . . . 202n) respectively have a video decoding ability of a conventional SDTV (Standard Definition TV) class. The video decoders (202a, 202b . . . 202n) respectively decode respective video bit streams (250a, 250b, . . . 250n) divided for each channel, and output them as video output signals (156a, 156b, . . . 156n) for each channel. The video decoders (202a, 202b, . . . 202n) carry out the video decoding according to the video clock 154 which is provided as a master clock. The video decoders (202a, 202b, . . . 202n) respectively decode video signals using respective internal partial video decoders (203a, 203b . . . 203n) and memories (204a, 204b, . . . 204n), and output respective video output signals (156a, 156b, . . . 156n).

The audio decoder 107 decodes the inputted audio stream signal 170 and outputs decoded audio signals (157a, 157b, . . . 157n) for each program as audio output signals. The data decoder 108 similarly decodes the inputted data stream 180 and outputs decoded data signals (160a, 160b, . . . 160n) for each program as data output signals.

FIG. 3 shows a plurality of monitors (332a, 332b, . . . 332n) connected to the digital video receiving apparatus of the first embodiment of the present invention. Video output terminals (330a, 330b, . . . 330n) are shown in FIG. 3. The video output terminal 330a includes the video output signal 156a, the audio output signal 157a and the data output signal 160a shown in FIG. 1. The video output terminal 330b includes the video output signal 156b, the audio output signal 157b and the data output signal 160b shown in FIG. 1. The video output terminal 330n includes the video output signal 156n, the audio output signal 157n and the data output signal 160n shown in FIG. 1. In this way, each set of output signals from the video decoder 106, the audio decoder 107 and the data decoder 108 is outputted to each monitor. Each of video, audio and data can be reproduced on each monitor.

The decoded video signals (156a, 156b, . . . 156n) outputted from the video decoder 106, the decoded audio signals (157a, 157b, . . . 157n) outputted from the audio decoder 107 and the decoded data signals (160a, 160b, . . . 160n) outputted from the data decoder 108 are outputted from the digital video receiving terminals as independent signals. Accordingly different pictures can be displayed on the different monitors by connecting the different monitors to the corresponding terminals of the digital video receiving apparatus.

Embodiment 2

Figure 4:
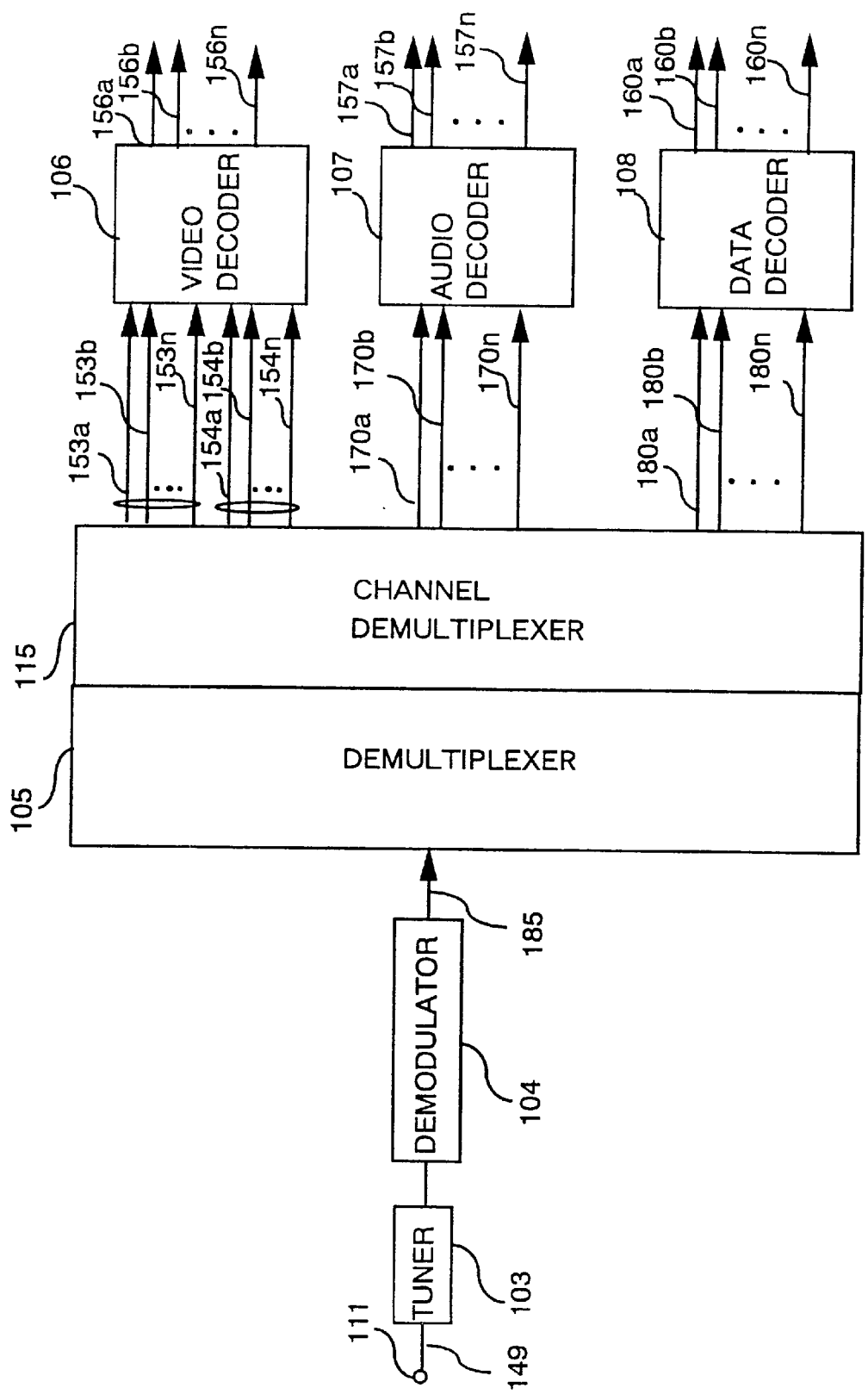
FIG. 4 shows a digital video receiving apparatus of a second embodiment of the present invention.

A digital video receiving apparatus of a second embodiment of the present invention is explained using FIG. 4. FIG. 4 shows a schematic diagram of the digital video receiving apparatus of the second embodiment of the present invention. In the second embodiment, a multiplexed video stream is demultiplexed by a demultiplexer and also demultiplexed for each channel by a channel-demultiplexer 115. The demultiplexed signal for each channel is provided to a video decoder 106. The digital video receiving apparatus of FIG. 4 includes an input terminal 111, a tuner 103, a demodulator 104, a demultiplexer 105, a video decoder 106, an audio decoder 107, a data decoder 108, a channel-demultiplexer 115, a multiplexed signal 185, demultiplexed channel video streams (153a, 153b, . . . 153n), demultiplexed channel clock signals (154a, 154b, . . . 154n), video output signals (156a, 156b, . . . 156n), audio streams (170a, 170b, . . . 170n), audio output signals (157a, 157b, . . . 157n), demultiplexed data signals (180a, 180b, . . . 180n), and data output signals 160a, 160b, . . . 160n).

The operation of the digital video receiving apparatus of the second embodiment of the present invention is explained using FIG. 4. A multiplexed digital signal is inputted to an input terminal 111 of the digital video receiving apparatus and the necessary signal elements thereof are extracted in the tuner 103. Then, the extracted signals are demodulated in the demodulator 104 and output as a multiplexed signal 185 to the demultiplexer 105. The multiplexed signal 185 input to the demultiplexer 105 has the same construction as that of the stream of the first embodiment of the present invention.

The demultiplexer 105 generates a stream identification signal (not shown) for demultiplexing a video stream, a clock signal and a channel from the multiplexed signal 185. The channel-demultiplexer 115 generates demultiplexed channel video streams (153a, 153b, . . . 153n) for each channel and demultiplexed channel clock signals (154a, 154b, . . . 154n) for each channel using the stream identification signal (not shown) generated by the demultiplexer 105. The video decoder 106 receives the demultiplexed channel video streams (153a, 153b, . . . 153n) corresponding to the programs and decodes them using the demultiplexed channel clock signals (154a, 154b, . . . 154n). The video decoder 106 outputs the decoded video signals (156a, 156b, . . . 156n) as video output signals.

The audio decoder 107 receives audio streams (170a, 170b, . . . 170n) corresponding to the programs and decodes them. The audio decoder 107 outputs decoded audio signals (157a, 157b, . . . 157n) for each program as audio output signals. The data decoder 108 similarly receives data streams (180a, 180b, . . . 180n) corresponding to the programs and decodes them. The data decoder 108 outputs decoded data signals (160a, 160b, . . . 160n) for each program as data output signals.

Each set of output signals from the video decoder 106, the audio decoder 107 and the data decoder 108 is outputted to each monitor. Each video, audio and data can be reproduced on each monitor in the same manner shown in the first embodiment of FIG. 3.

The decoded video signals (156a, 156b, . . . 156n) outputted from the video decoder 106, the decoded audio signals (157a, 157b, . . . 157n) outputted from the audio decoder 107 and the decoded data signals (160a, 160b, . . . 160n) outputted from the data decoder 108 are outputted from the digital video receiving terminals as independent signals. Accordingly different pictures can be displayed on the different monitors by connecting the different monitors to the corresponding terminals of the digital video receiving apparatus.

Figure 5:
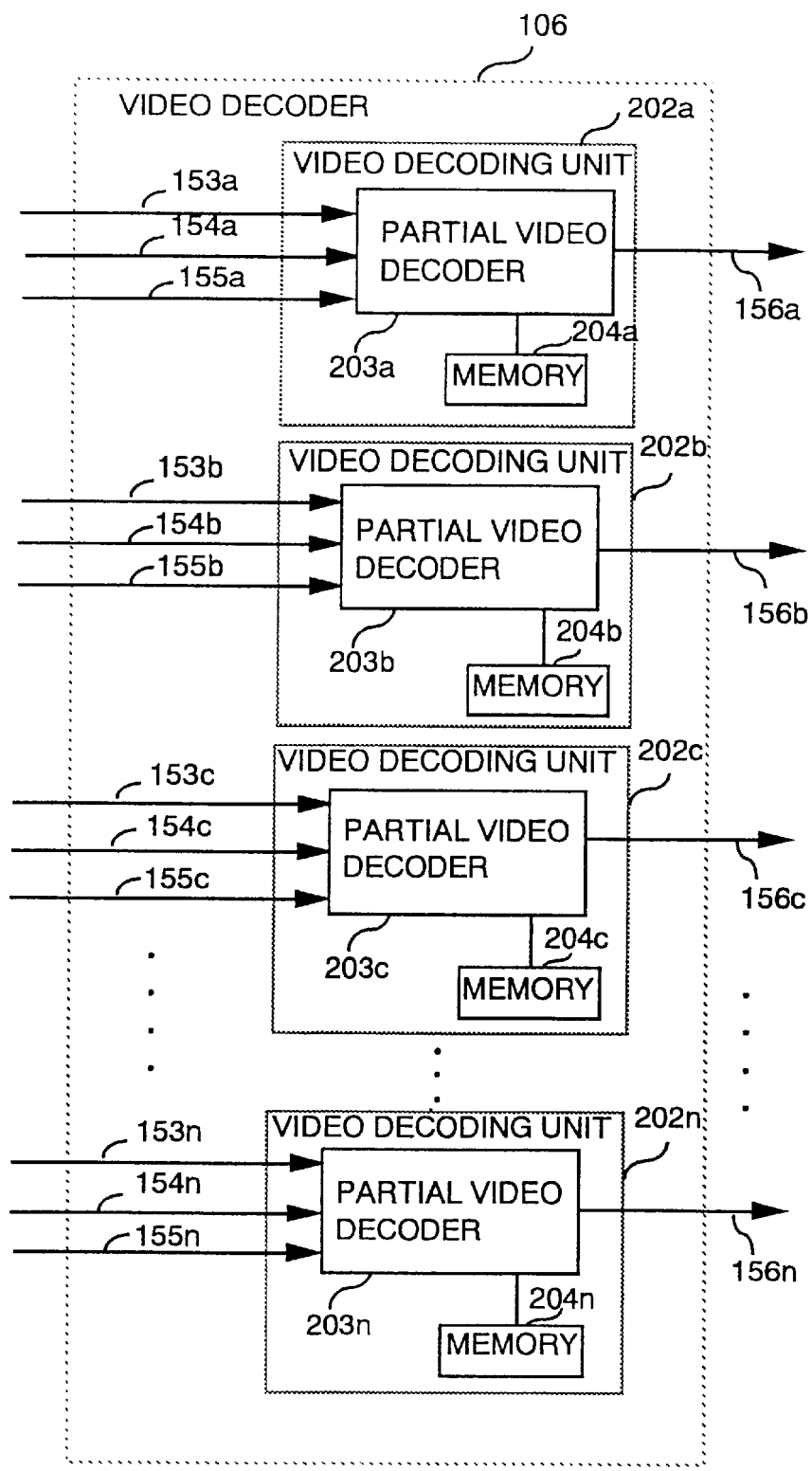
FIG. 5 shows a video decoder used in the digital video receiving apparatus of the second embodiment of the present invention.

The video decoder 106 in the digital video receiving apparatus of the second embodiment of the present invention is explained using FIG. 5. In FIG. 5, the input signal to the video decoder 106 is not an n-channel multiplexed video signal, but it is a demultiplexed video signal for each channel, which is different from the video decoder 106 of the first embodiment of the present invention. The video decoder 106 of FIG. 5 includes video decoders (202a, 202b, . . . 202n), video decoders (203a, 203b, . . . 203n) for each channel and memories (204a, 204b, . . . 204n), each corresponding to the video decoders (202a, 202b, . . . 202n).

The video stream 153a, the clock signal 154a and the stream identification signal 155a are input to the video decoding unit 202a and decoded therein. Since the operation of the video decoding unit 202a is the same as that of the first embodiment shown in FIG. 3, the detailed description thereof is omitted. Similarly, other video decoders (202a, 202b, . . . 202n) also output decoded video signals (156a, 156b, . . . 156n), respectively. The different pictures for each channel can be reproduced by connecting the decoded video signals (156a, 156b, . . . 156n) to the respective monitors.

Embodiment 3

Figure 6:
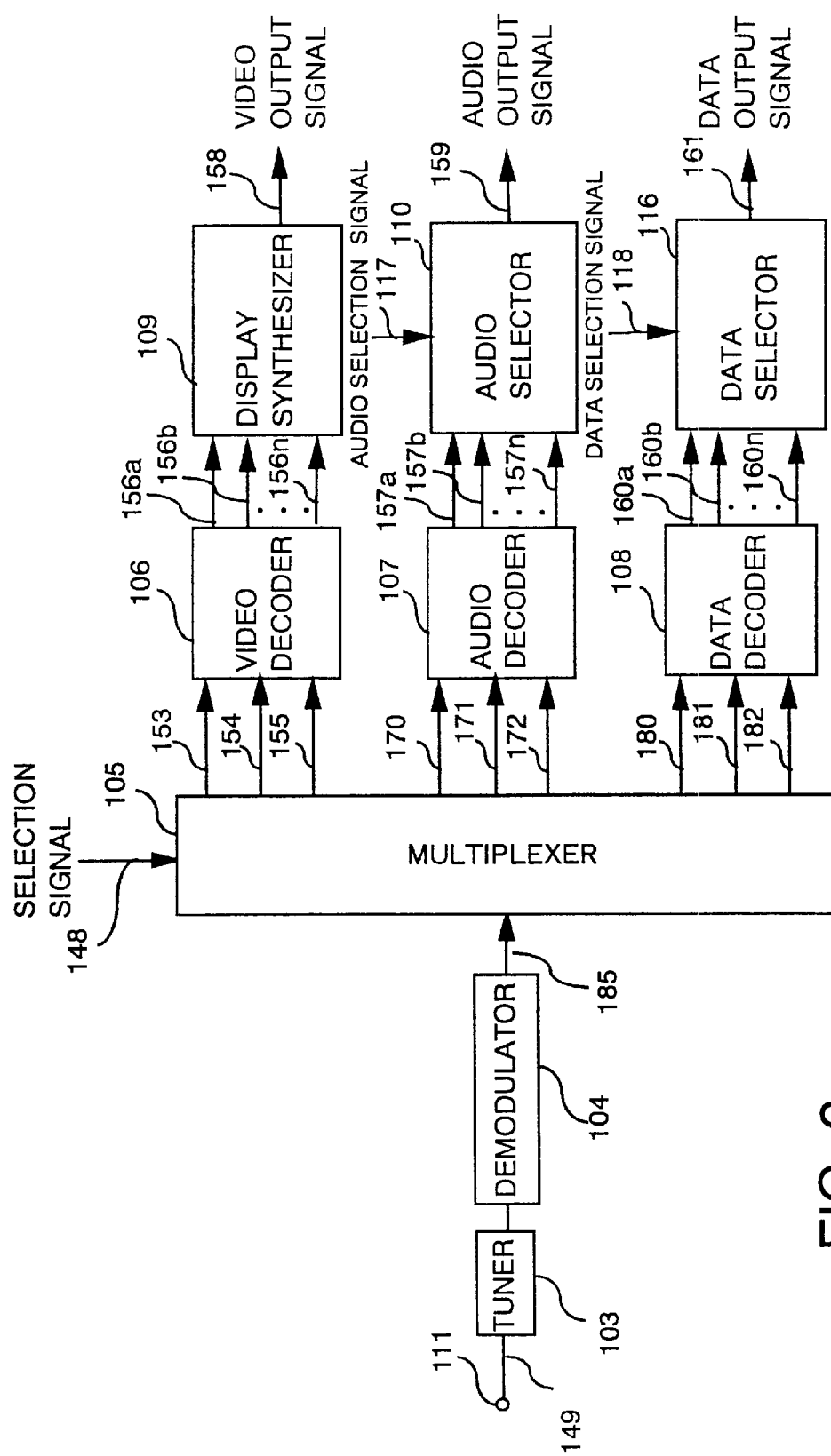
FIG. 6 shows a digital video receiving apparatus of a third embodiment of the present invention.

A digital video receiving apparatus of a third embodiment of the present invention is explained using FIG. 6. FIG. 6 shows a schematic diagram of the digital video receiving apparatus of the third embodiment of the present invention. The digital video receiving apparatus of FIG. 6 includes an input terminal 111, a tuner 103, a demodulator 104, a demultiplexer 105, a video decoder 106, an audio decoder 107, a data decoder 108, a display synthesizer 109, an audio selector 110, a data selector 116, a selection signal 148, a video stream 153, a clock signal 154, a stream identification signal 155, decoded video signals (156a, 156b, . . . 156n), decoded audio signals (157a, 157b, . . . 157n), a video output signal 158, an audio output signal 159, decoded data signals (160a, 160b, . . . 160n), a data output signal 161 and a multiplexed signal 185.

The operation of the digital video receiving apparatus of the third embodiment of the present invention is explained using FIG. 6. A multiplexed digital signal is inputted to the input terminal 111 of the digital video receiving apparatus and the desired signal elements thereof are extracted in the tuner 103. The extracted digital signals are demodulated by the demodulator 104 and inputted to the demultiplexer 105. In the digital video receiving apparatus in the first and the second embodiments of the present invention, only normal SDTV signals are input to the input terminal 111. On the other hand, in the digital video receiving apparatus of the third embodiment of the present invention, a HDTV signal or both SDTV signals and a HDTV signal are input to the input terminal 111. In the case of SDTV, processing from the tuner 103 to the video decoder 106 is similar to that of the digital video receiving apparatus described of the first embodiment of the present invention. In HDTV, however, since the bandwidth of the signal is broader, each video decoder 106 cannot decode all bandwidth of the HDTV signals at once. Therefore, the HDTV signal is divided into a plurality of partial signals corresponding to a plurality of pictures. The partial video decoders (203a, 203b, . . . 203n) in the video decoder 106 decode the respective divided partial signals (250a, 250b, . . . 250n) and regenerate HDTV by synthesizing the decoded signals (156a, 156b, . . . 156n). The partial video decoders (203a, 203b, . . . 203n) operate in the same way as the partial video decoders (203a, 203b, . . . 203n) in the first embodiment.

Figure 7:
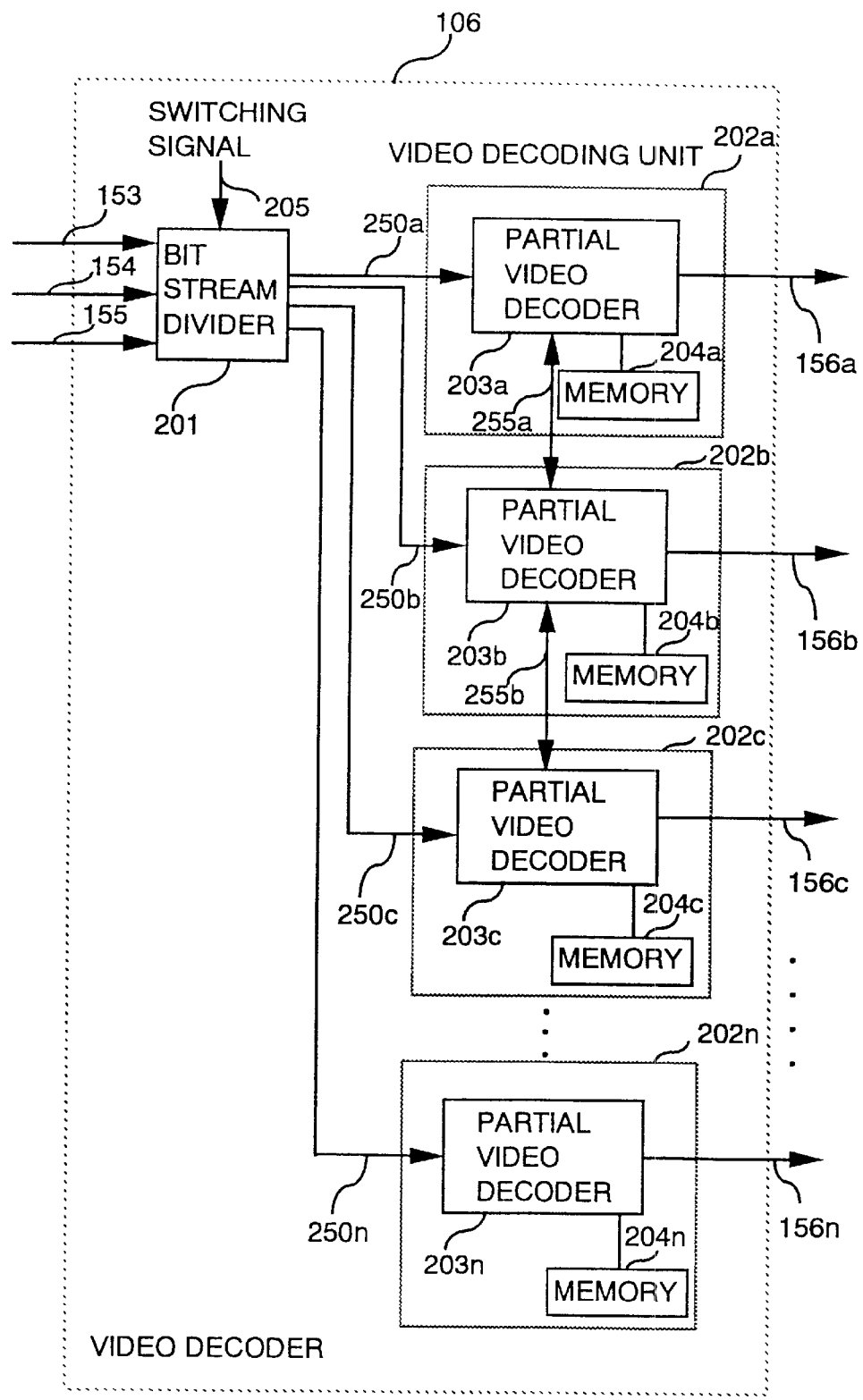
FIG. 7 shows a video decoder used in the digital video receiving apparatus of the third embodiment of the present invention.

The operation of the video decoder 106 is explained in the case that SDTV signals and a HDTV signal are input therein using FIG. 7. A switching signal 205 switches the dividing mode according to whether the bit stream 153 inputted to a bit stream divider 201 is the conventional SDTV(Standard Definition TV) or HDTV (High Definition TV). The switching signal 205 may be generated within the bit stream divider 201 according to the kind of the video stream 153.

In the Case of SDTV:

The operation of the video decoder 106 is explained in the case that the SDTV signals are input therein. In the bit stream divider 201, the video stream 153, the clock signal 154 and the stream identification signal 155 are divided for each channel and are sent to respective video decoders (202a, 202b, . . . 202n). Respective video decoders (202a, 202b, . . . 202n) output respective decoded video signals (156a, 156b, . . . 156n). Since the method for generating the decoded video signals is similar to that of the first embodiment, the explanation thereof is omitted.

In the Case of HDTV:

The operation of the video decoder 106 is explained in the case that HDTV is inputted therein. The HDTV signal inputted into the video decoder 106 is divided into each partial video signal corresponding to each partial picture based on the video stream 153, the clock signal 154 and the stream identification signal 155, and the respective divided partial video signal are sent to respective video decoders (202a, 202b, . . . 202n). The partial video decoders (203a, 203b, . . . 203n) in the respective video decoders (202a, 202b, . . . 202n) decode each partial video signal. If data from adjacent video decoders (202a, 202b, . . . 202n) are needed for decoding, respective video decoders (202a, 202b, . . . 202n) decode the signals using inter-video decoder connection lines (255a, 255b, . . . 255n) and memories (204a, 204b, . . . 204n), and output decoded signals (156a, 156b, . . . 156n).

The decoded signals (156a, 156b, . . . 156n) outputted from the video decoder 106 are input to the display synthesizer 109 as shown in FIG. 6. The display synthesizer 109 synthesizes the video output signals (156a, 156b, . . . 156n) and a plurality of partial pictures are displayed on a monitor. Examples thereof are shown in FIG. 8 and FIG. 9.

Figure 8:
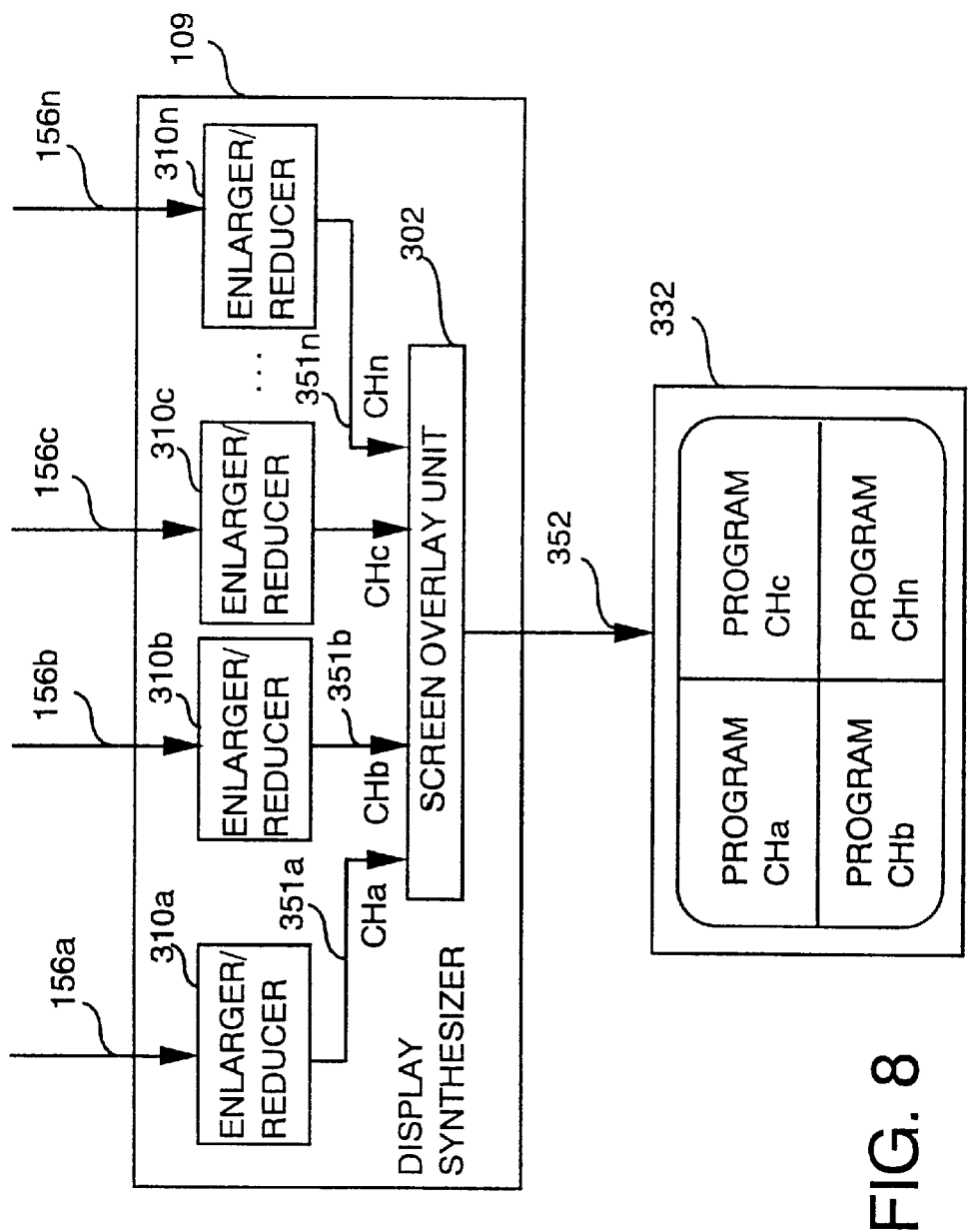
FIG. 8 shows a monitor which displays a plurality of SDTV pictures from the digital video receiving apparatus of the third embodiment of the present invention.
Figure 9:
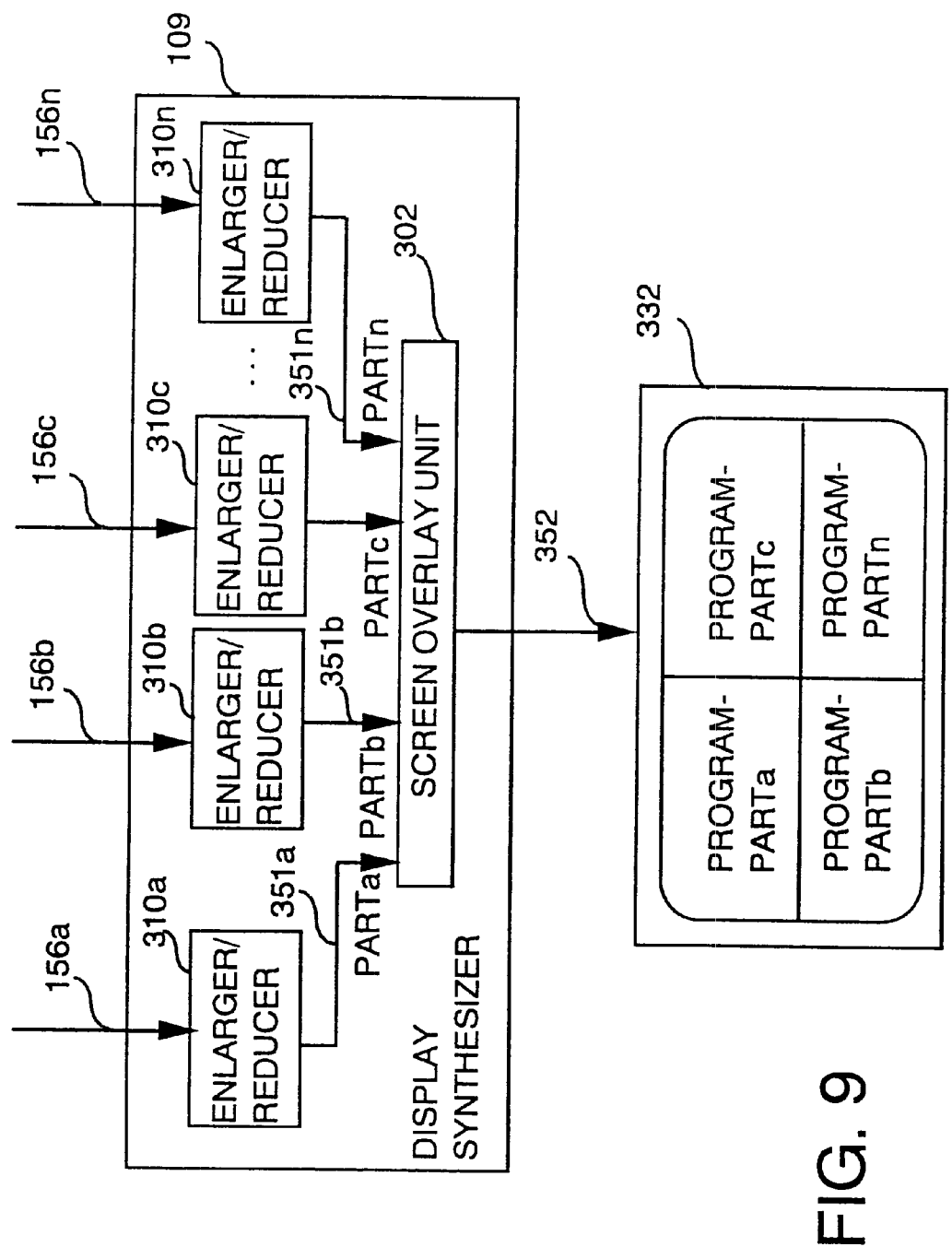
FIG. 9 shows a monitor which displays HDTV pictures from the digital video receiving apparatus of the third embodiment of the present invention.

In the Case of a Plurality of SDTV Signals:

FIG. 8 shows an example for displaying a plurality of SDTV decoded signals on a monitor. A display synthesizer 109 of FIG. 8 includes enlarger/reducer units (310a, 310b, . . . 310n), and a screen overlay unit 302. In FIG. 8, the respective decoded video signals (156a, 156b, . . . 156n) received from the video decoder 106 are input to the enlarger/reducer units (310a, 310b, . . . 310n) for each channel. The respective decoded video signals (156a, 156b, . . . 156n) are enlarged or reduced to desired sizes according to a plurality of screen sizes in the monitor 332. Then, the enlarged or reduced signals are synthesized in the screen overlay unit 302 and outputted to the monitor 332 as a synthesized signal 352. As a result, a plurality of pictures corresponding to respective channels are displayed on a monitor 332.

In the Case of a HDTV Signal:

FIG. 9 shows an example for enlarging/reducing the divided decoded video signals, and synthesizing them to display a HDTV picture on a monitor. A display synthesizer 109 of FIG. 9 includes enlarger/reducer units (310a, 310b, . . . 310n), and a screen overlay unit 302. In FIG. 9, the respective decoded video signals (156a, 156b, . . . 156n) received from the video decoder 106 are input to the enlarger/reducer units (310a, 310b, . . . 310n) for each part. The respective decoded video signals (156a, 156b, . . . 156n) are enlarged or reduced to desired sizes according to positions of screen sizes in the monitor 332. Then, the enlarged or reduced signals are synthesized in the screen overlay unit 302 and outputted to the monitor 332 as a synthesized signal 352. As a result, a HDTV picture combined by the respective parts is displayed on one monitor 332.

The audio decoder 107 in FIG. 6 decodes audio streams 170 including a plurality of audio signals and sends them to the audio selector 110. The audio selector 110 selects a desired audio signal (in this case of HDTV, only 157a is selected) according to an audio selection signal 117 and outputs the selected audio signal as an audio output signal 159. The data decoder 108 similarly decodes the data stream 180 and sends the decoded signal to a data selector 116. The data selector 116 selects a desired data signal (in this case of HDTV, only 160a is selected) according to a data selection signal 118 and outputs the selected data signal as a data output signal 161.

Embodiment 4

Figure 10:
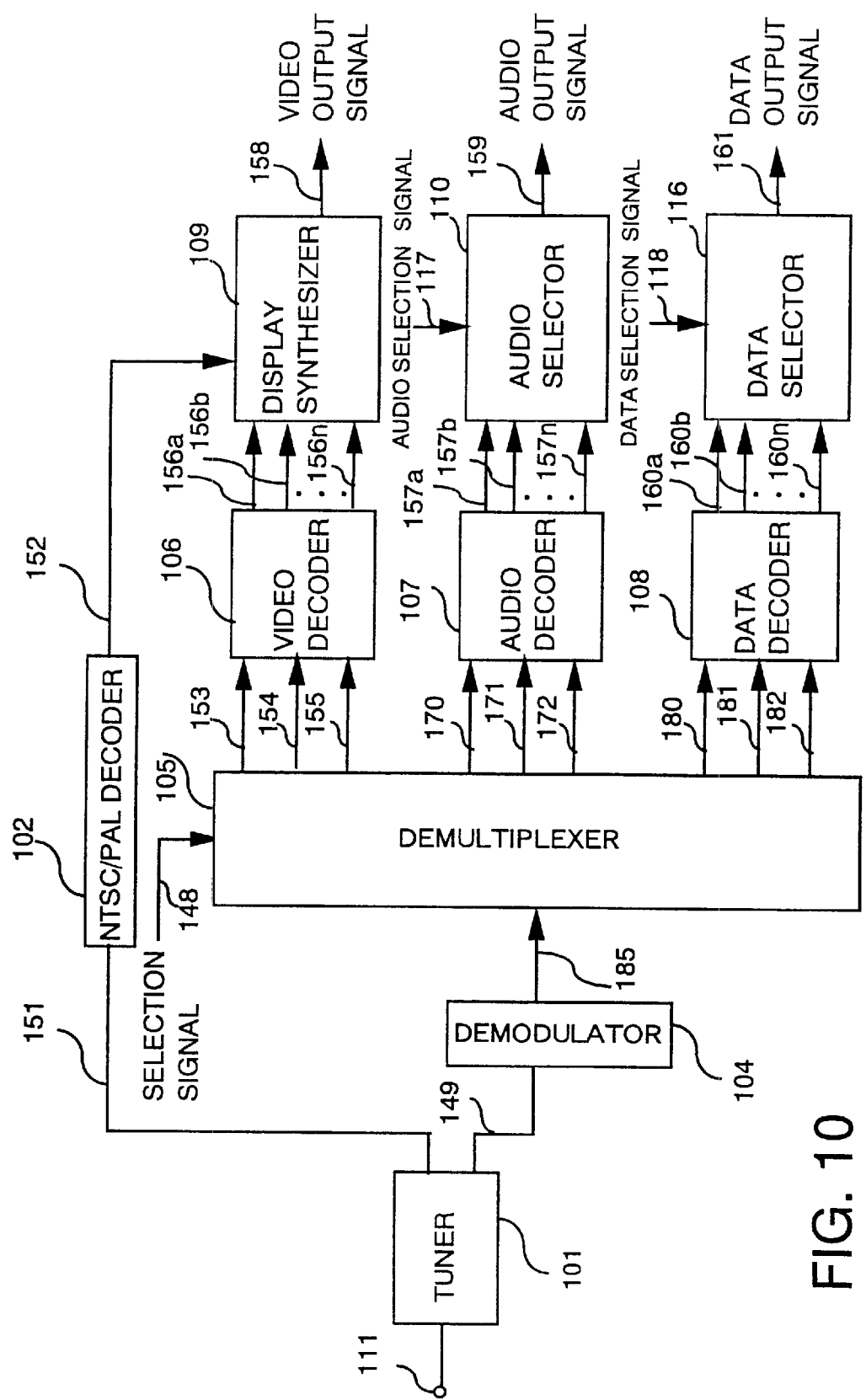
FIG. 10 shows a digital video receiving apparatus of a fourth embodiment of the present invention.
Figure 11:
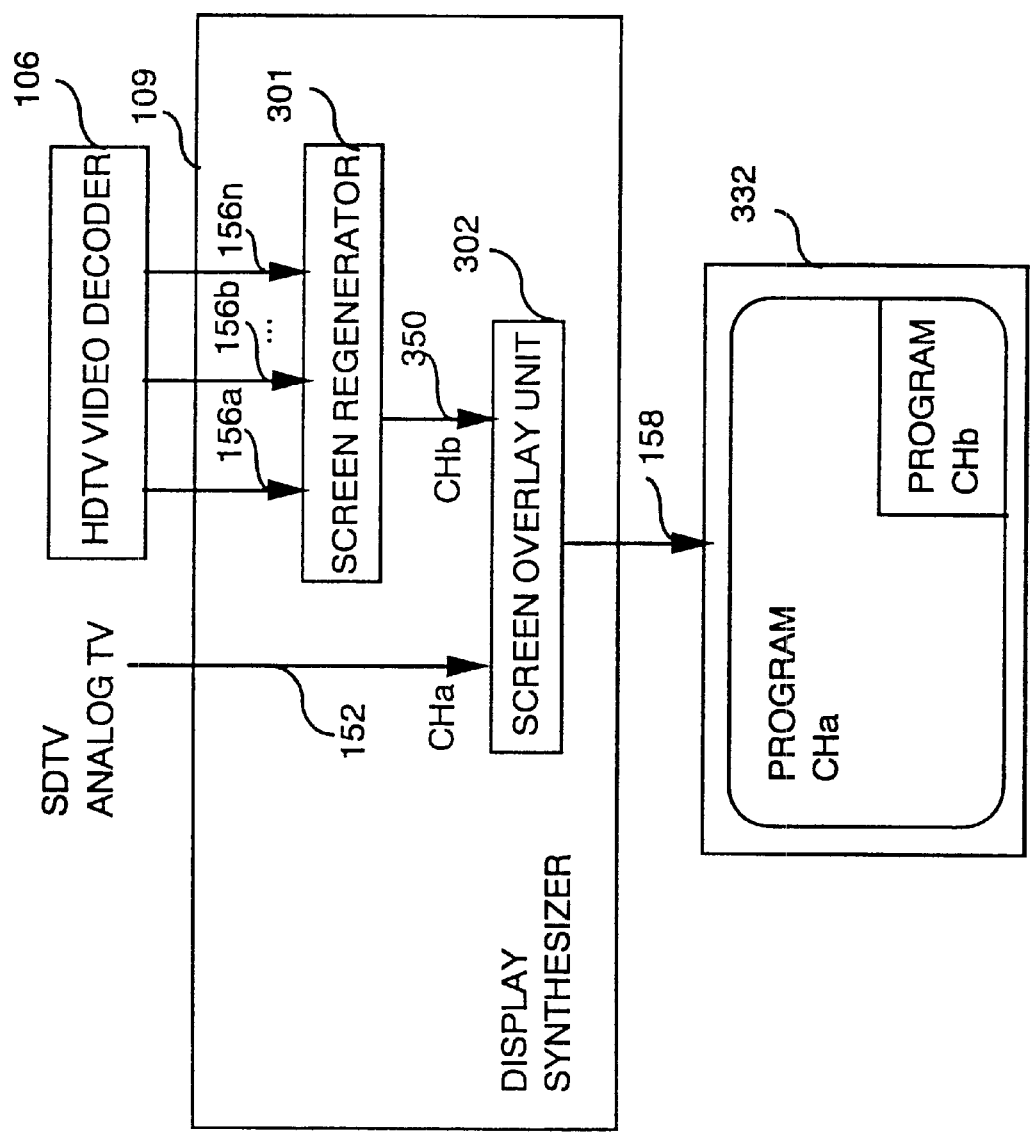
FIG. 11 shows a monitor which displays one SDTV picture and one HDTV picture from the digital video receiving apparatus of the fourth embodiment of the present invention on one monitor.

A digital video receiving apparatus of a fourth embodiment of the present invention is explained using FIGS. 10 and 11. FIG. 10 shows a schematic diagram of the digital video receiving apparatus of the fourth embodiment of the present invention. The digital video receiving apparatus of FIG. 10 includes a tuner 101, an NTSC/PAL decoder 102, a demodulator 104, a demultiplexer 105, a video decoder 106, an audio decoder 107, a data decoder 108, a display synthesizer 109, an audio selector 110, a data selector 116, a selection signal 148, a digital base band signal 149, a multiplexed signal 185, an analog base band signal 151, an analog video signal 152, a video stream 153, a clock signal 154, a stream identification signal 155, decoded video signals (156a, 156b, . . . 156n), decoded audio signals (157a, 157b, . . . 157n), an audio selection signal 117, data selection signal 118, a video output signal 158, an audio output signal 159, decoded data signals (160a, 160b, . . . 160n), and a data output signal 161.

The operation of the digital video receiving apparatus shown in FIG. 10 of a fourth embodiment of the present invention is explained. Signals received via a satellite communication or a ground wave communication are branched to an analog base band signal 151 and a digital base band signal 149 by the tuner 101. The analog base band signal 151 is converted to an analog video signal 152 by the NTSC/PAL decoder 102. The digital base band video signal 149 is demodulated by the demodulator 104 and the demodulated multiplexed signal 185 is sent to the demultiplexer 105. The demodulated multiplexed signal 185 is a multiplexed bit stream including a plurality of SDTV programs or a bit stream including one HDTV program. FIG. 12 shows a bit stream comprising a plurality of SDTV programs. Accompanying data such as clock are included in the header of each packet.

The demultiplexer 105 receives the input multiplexed signal 185 and demultiplexes it to a video signal, an audio signal and a data signal. The respective signals are divided into a stream signal, a clock signal and a stream identification signal in the case of SDTV. For example, as for the video signal, the demultiplexer 105 outputs the video stream 153, the clock signal 154, and the stream identification signal 155 to the video decoder 106. The clock signal 154 corresponds to a plurality of programs, and the stream identification signal 155 is a control signal for selecting a desired program. As for the audio signal, the demultiplexer 105 outputs the audio signal and outputs the audio stream 170, the clock signal 171, and the stream identification signal 172 to the audio decoder 107. The clock signal 171 corresponds to a plurality of programs, and the stream identification signal 172 is a control signal for selecting a desired program. As for the data signal, the same process is carried out. In the case of SDTV, the demultiplexer 105 extracts only necessary programs and outputs the video stream 153 based on the selection signal 148 inputted from the outside.

In the case of HDTV, the demultiplexer 105 outputs a partial signal stream 153, a clock signal 154 and a stream identification signal 155. The clock signal 154 corresponds to a plurality of programs, and the stream identification signal 155 is a control signal for selecting a desired partial signal from the multiplexed signal 185.

In the case of SDTV, the video decoder 106 outputs the decoded video signals (156a, 156b, . . . 156n) corresponding to each program. In the case of HDTV, the video decoder 106 outputs the decoded video signals (156a, 156b, . . . 156n) corresponding to each part. Since the decoding method in the video decoder 106 is same as that of the third embodiment, the explanation thereof is omitted.

The display synthesizer 109 in the fourth embodiment synthesizes a plurality of decoded HDTV partial video signals (156a, 156b, . . . 156n) outputted from the video decoder 106. When the analog video 152 is outputted from the NTSC/PAL decoder 102, the display synthesizer 109 synthesizes the analog SDTV and the digital HDTV and outputs the video signal 158 to display it on a monitor.

An example of synthesizing the analog SDTV picture and the digital HDTV picture is depicted in FIG. 11. In FIG. 11, the screen regenerator 301 synthesizes the decoded HDTV partial video signals (156a, 156b, . . . 156n) outputted from the video decoder 106 and regenerates a HDTV video signal 350. When one of the HDTV picture and the SDTV picture is displayed in the picture-in-picture system on one monitor, a screen overlay unit 302 overlays the HDTV signal and SDTV signal and outputs a video signal 158 to a monitor 332. The monitor 332 can display the analog picture and the digital picture in one monitor as shown in FIG. 11 in the picture-in-picture system. When the multiplexed signal 185 is a SDTV signal, as stated in the third embodiment, the screen regenerator 301 synthesizes a plurality of the SDTV video signals. Then, the screen overlay unit 302 may overlay a plurality of the SDTV pictures and an analog picture on one monitor.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A digital video receiving apparatus for receiving digital broadcasting programs having a plurality of multiplexed media including video and audio, the apparatus comprising:
    a tuner receiving a multiplexed signal containing video and audio data for each of a plurality of programs and converting the multiplexed signal to a digital base band signal;
    a demodulator demodulating the digital base band signal provided from said tuner, plurality of programs and converting the multiplexed signal to a digital base band signal;
    a demodulator demodulating the digital base band signal provided from said tuner, thereby generating a demodulated digital base band signal containing video and audio data for each of a plurality of programs;
    a demultiplexer selecting one or more programs, each program having a plurality of multiplexed media including video and audio, from the demodulated digital base band signal according to a program selection signal generated in accordance with a user's indication of a desired program, and demultiplexing respective video and audio bit streams from the demodulated digital base band signal;
    a video decoder decoding a video stream demultiplexed by said demultiplexer, said video decoder including a bit stream divider and a plurality of video decoding units, said bit stream divider generating multiple video streams that respectively correspond to different channels, each of said plurality of said video decoding units receiving a video stream for a different channel; and
    an audio decoder decoding an audio stream demultiplexed by said demultiplexer.

2. The digital video receiving apparatus of claim 1, wherein
    the demodulated digital base band signal includes a data signal,
    said demultiplexer demultiplexes the data signal from the demodulated digital base band signal, and
    said apparatus further comprises:
        a data decoder decoding the data signal demultiplexed by said demultiplexer.

3. The digital video receiving apparatus of claim 2, wherein
    said video decoder includes a plurality of video decoding units, each of said video decoding units including a partial video decoder and a memory, and
    each video decoding unit decodes a video stream provided by said channel demultiplexer, using a clock signal and a stream identification signal, and outputs a decoded signal as a video output signal.

4. A digital video receiving apparatus, comprising:
    a tuner receiving a multiplexed signal containing video and audio data for each of a plurality of programs and converting the multiplexed signal to a digital base band signal;
    a demodulator demodulating the digital base band signal provided from said tuner, thereby generating a demodulated digital base band signal containing video and audio data for each of a plurality of programs;
    a demultiplexer selecting one or more programs, each program having a plurality of multiplexed media including video and audio, from the demodulated digital base band signal according to a program selection signal generated in accordance with a user's indication of a desired program, and demultiplexing respective video and audio bit streams from the demodulated digital base band signal;
    a video decoder decoding a video stream demultiplexed by said demultiplexer; and
    an audio decoder decoding an audio stream demultiplexed by said demultiplexer, wherein said video decoder includes a bit stream divider and a plurality of video decoding units, each of said video decoding units including a partial video decoder and a memory, said bit stream divider generates a video stream including a video signal and an audio signal for each channel, using a clock and a stream identification signal, and each video decoding unit decodes the respective video stream for a channel using said partial video decoder and said memory, and outputs the decoded signal as a video output signal.

5. The digital video receiving apparatus of claim 4, wherein the demodulated digital base band signal includes a data signal, said demultiplexer demultiplexes a data signal from the demodulated digital base band signal, and said apparatus further comprises:

a data decoder decoding the data signal demultiplexed by said demultiplexer.

6. A digital video receiving apparatus for receiving digital broadcasting programs having a plurality of multiplexed media including video and audio, the apparatus comprising:

a tuner receiving a multiplexed signal and converting the multiplexed signal to a digital base band signal;

a demodulator demodulating the digital base band signal provided from said tuner;

a demulitplexer demultiplexing and outputting a bit stream including a video signal and an audio signal, a clock, and a stream identification signal for each of a plurality of channels according to a selection signal, when the multiplexed signal is an SDTV signal, and demultiplexing and outputting a bit stream including a video signal and an audio signal, a clock, and a stream identification signal for each of a plurality of partial pictures according to a selection signal, when the multiplexed signal is an HDTV signal;

a video decoder decoding the video signals demultiplexed by said demultiplexer, said video decoder including a plurality of video decoding units, each of said plurality of video decoding units receiving and decoding a video stream for a different channel when the multiplexed signal is an SDTV signal, each of said plurality of video decoding units receiving and decoding a different partial picture video stream when the multiplexed signal is an HDTV signal;

an audio decoder decoding the audio signals demultiplexed by said demultiplexer;

a display synthesizer synthesizing a plurality of the signals outputted from said video decoder and generating a video signal to display on one monitor; and an audio selector selecting an audio signal outputted from said audio decoder.

7. The digital video receiving apparatus of claim 6, wherein said video decoder includes a bit stream divider, each of said video decoding units includes a partial video decoder and a memory, said bit stream divider generates a video stream for each of a plurality of channels from the video signal outputted from the demultiplexer, according to a switching signal, each of said video decoding units decoding the video stream for a different channel to output a video signal, when the multiplexed signal is an SDTV signal, and said bit stream divider generates a video stream for each of a plurality of partial pictures from the video signal outputted from the demultiplexer, according to the switching signal, each of said video decoding units decoding the video stream for a different partial picture to output a video signal, when the multiplexed signal is an HDTV signal.

8. The digital video receiving apparatus of claim 6, wherein said display synthesizer includes a plurality of enlarger/reducer units and a screen overlay unit, and said display synthesizer enlarges or reduces sizes of the decoded signals inputted from the video decoder, superposes a plurality of the enlarged or reduced video signals and generates a video signal to display on one monitor when a multiplexed signal is an SDTV signal.

9. The digital video receiving apparatus of claim 6, wherein the demodulated base band signal includes a data signal, said demultiplexer demultiplexes the data signal from the demodulated digital base band signal, and said apparatus further comprises:

a data decoder decoding the data signal demultiplexed by said demultiplexer.

10. A digital video receiving method for receiving digital broadcasting programs having a plurality of multiplexed media including video and audio, comprising:

receiving a multiplexed signal containing video and audio data for each of a plurality of programs and converting the multiplexed signal to a digital base band signal;

demodulating the digital base band signal, thereby generating a demodulated digital base band signal containing video and audio data for each of a plurality of programs;

selecting one or more programs, each having a plurality of multiplexed media including video and audio, from the demodulated digital base band signal, having a plurality of multiplexed media including video and audio, according to a program selection signal generated in accordance with a user's indication of a desired program, and demultiplexing respective video and audio bit streams from the demodulated digital base band signal;

video decoding a demultiplexed video stream, said video decoding being performed by video decoder that includes a bit stream divider and a plurality of video decoding units, said bit stream divider generating multiple video streams that respectively correspond to different channels, each of said plurality of said video decoding units receiving a video stream for a different channel; and audio decoding a demultiplexed audio stream.

11. A digital video receiving method for receiving digital broadcasting programs having a plurality of multiplexed media including video and audio, comprising:

receiving a multiplexed signal and converting the multiplexed signal to a digital base band signal;

demodulating the digital base band signal;

demultiplexing and outputting a bit stream including a video signal and an audio signal, a clock, and a stream identification signal for each of a plurality of channels according to a selection signal, when the multiplexed signal is an SDTV signal, and demultiplexing and outputting a bit stream including a video signal and an audio signal, a clock, and a stream identification signal for each of a plurality of partial pictures according to a selection signal, when the multiplexed signal is an HDTV signal;

video decoding the demultiplexed video signals, said video decoding being performed by a video decoder that includes a plurality of video decoding units, each of the plurality of video decoding units receiving and decoding a video stream for a different channel when the multiplexed signal is an SDTV signal, each of the plurality of video decoding units receiving and decoding a different partial picture video stream when the multiplexed signal is an HDTV signal;

audio decoding the demultiplexed audio signals;

synthesizing a plurality of the signals output from the video decoder and generating a video signal to display on one monitor; and selecting a decoded audio signal.

12. A digital video receiving method, comprising:

receiving a multiplexed signal containing video and audio data for each of a plurality of programs and converting the multiplexed signal to a digital base band signal;

demodulating the digital base band signal, thereby generating a demodulated digital base band signal containing video and audio data for each of a plurality of programs;

selecting one or more programs, each program having a plurality of multiplexed media including video and audio from the demodulated digital base band signal, having a plurality of multiplexed media including video and audio, according to a program selection signal generated in accordance with a user's indication of a desired program, and demultiplexing respective video and audio bit streams from the demodulated digital base band signal;

video decoding a demultiplexed video stream; and audio decoding a demultiplexed audio stream, wherein
said video decoding is preformed by a video decoder that includes a bit stream divider and a plurality of video decoding units, each of said video decoding units including a partial video decoder and a memory, said bit stream divider generates a video stream including a video signal and an audio signal for each channel, using a click and a stream identification signal, and each video decoding unit decodes the respective video stream for a channel using said partial video decoder and said memory, and outputs the decoded signal as a video output signal.

* * * * *